Sept. 12, 1944. C. R. GOLAY 2,358,224
PORTABLE DUMP BODY
Filed April 22, 1942 3 Sheets-Sheet 1
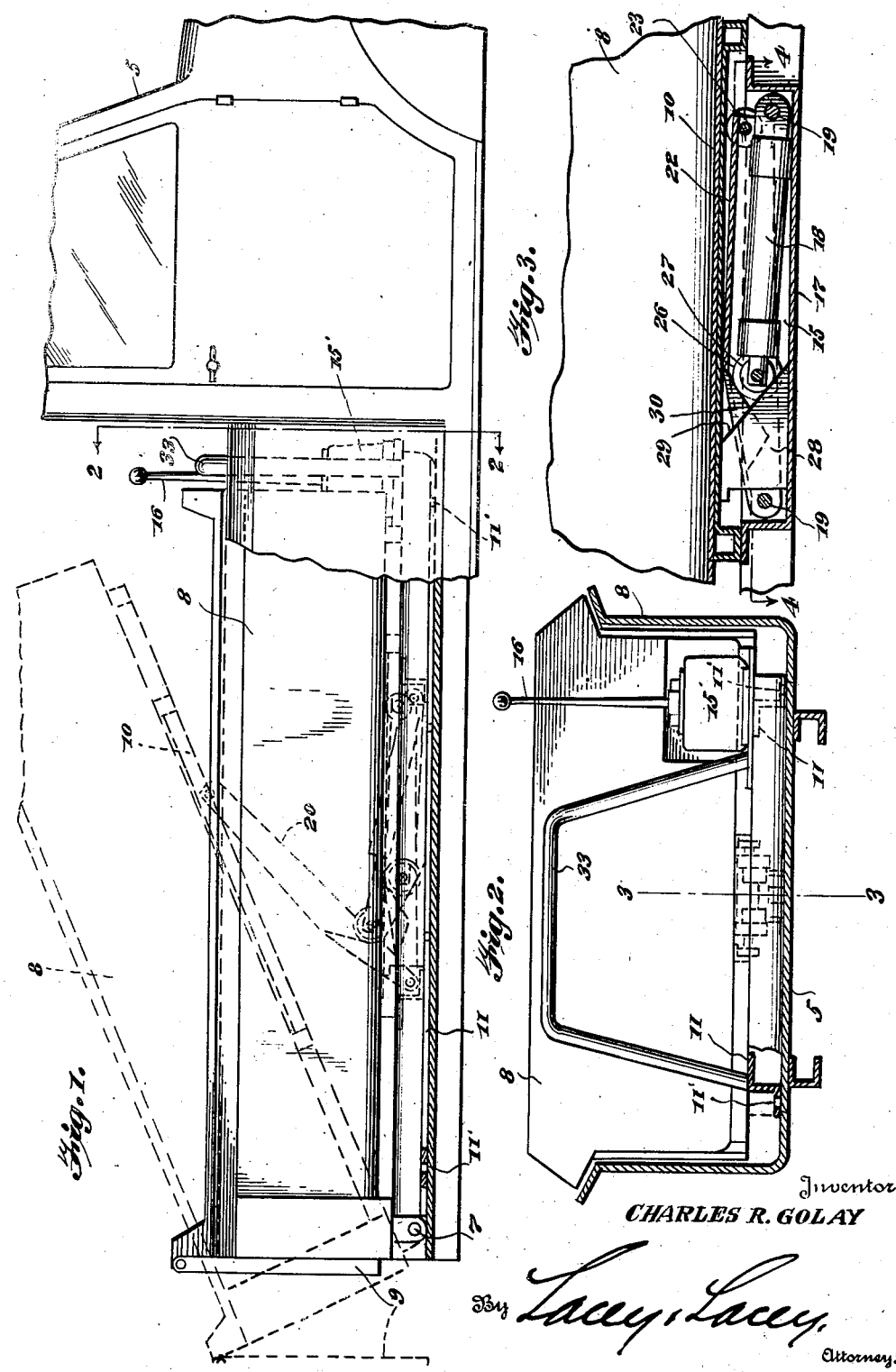
Inventor
CHARLES R. GOLAY
By Lacey & Lacey
Attorneys

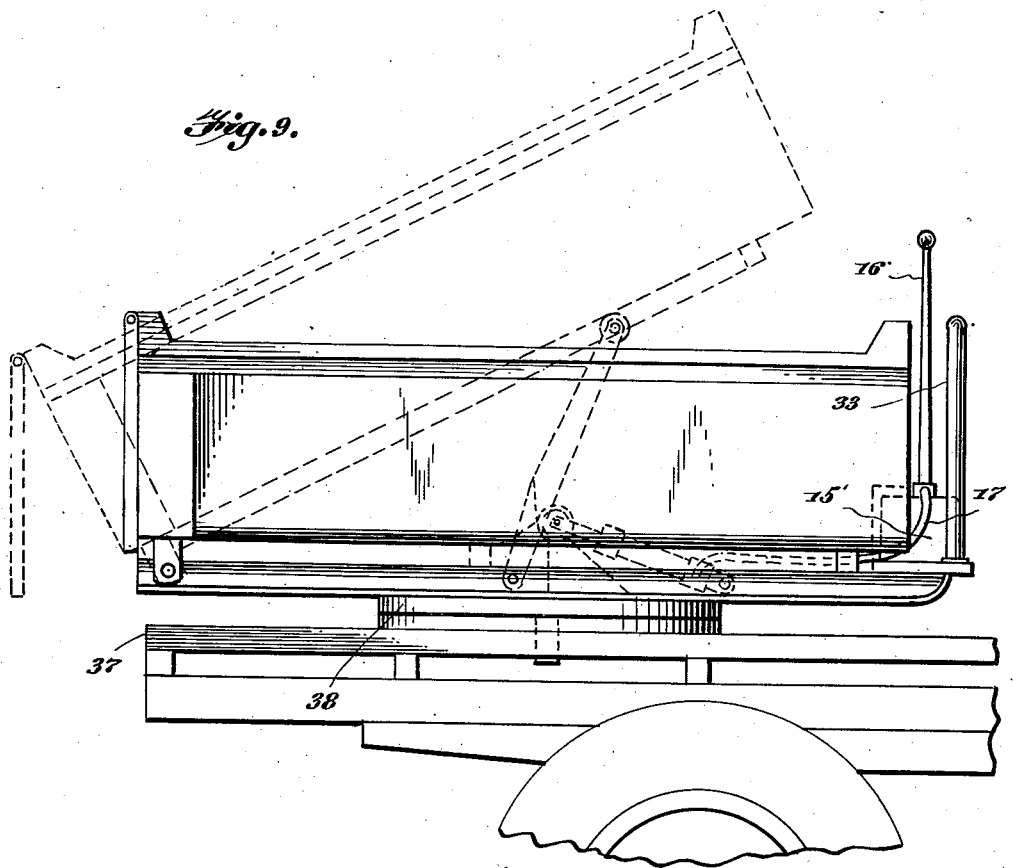
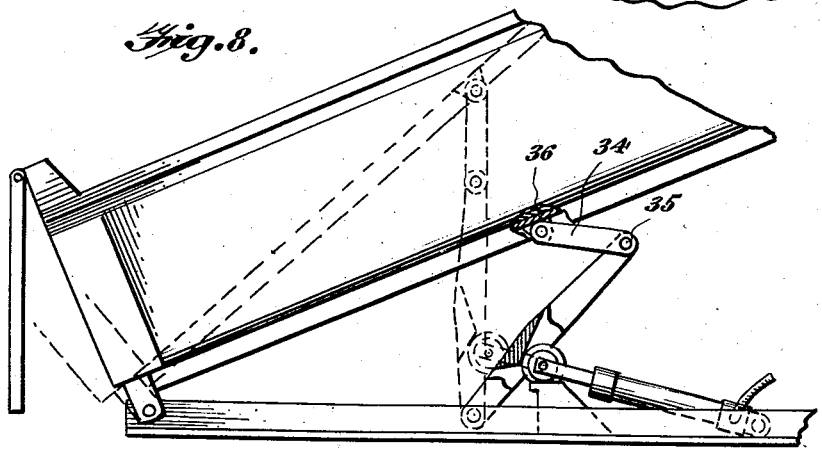

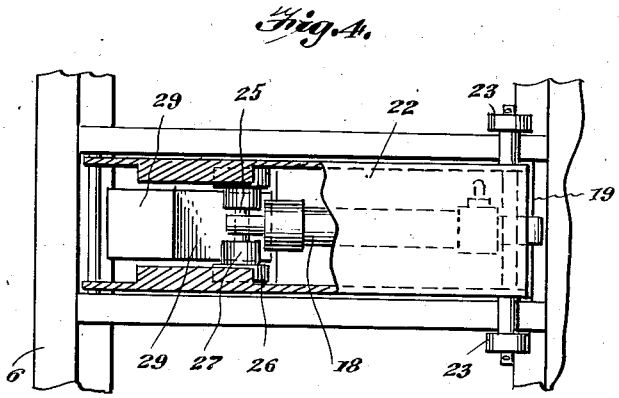
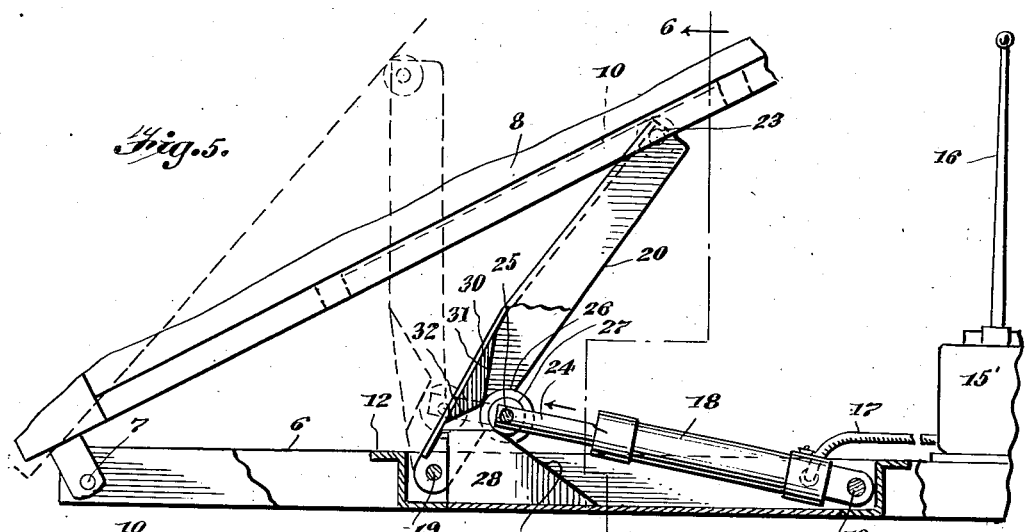
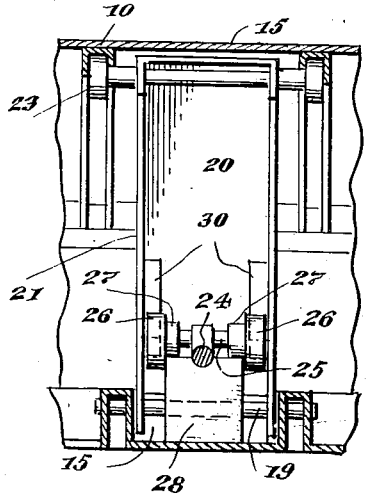
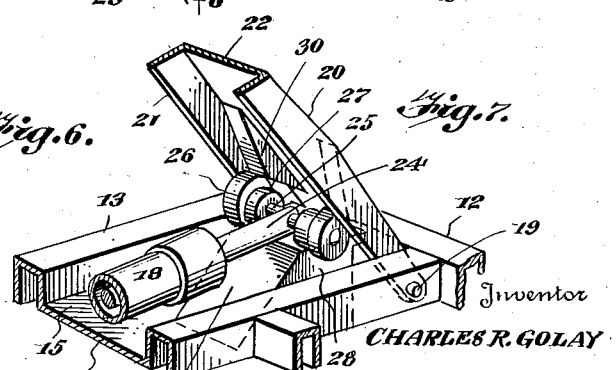

Patented Sept. 12, 1944

2,358,224

UNITED STATES PATENT OFFICE 2,358,224

PORTABLE DUMP BODY

Charles R. Golay, Cambridge City, Ind.

Application April 22, 1942, Serial No. 440,083

5 Claims. (Cl. 298—22)

This invention relates to vehicle trucks and more particularly to a portable dump body for converting a pick-up truck or other type of conveyance into an hydraulically operated dumping truck.

The object of the invention is to provide a dump body of simple and compact construction having hydraulic dumping mechanism associated therewith and capable of being quickly slid, as a unit, within the body of an ordinary pick-up truck or permanently or otherwise bolted to any standard automobile truck chassis, thereby to convert said truck into a power actuated dumping truck.

A further object is to so construct the power unit and associated parts of the dump body as to start the dumping of a heavy load slowly under maximum power and gradually to speed the dumping operation as the load is released, means being provided for exerting a direct thrust on the lifting arms as the body approaches dumping position, thereby to accelerate tilting movement of said arms and discharge of the load.

A further object is to provide the ram of the hydraulic mechanism with terminal rollers, certain of which engage a stationary wedge-shaped member on the supporting frame of the dump body and others of said rollers triangular shaped members carried by the lifting arms, the several parts being so arranged that, when the dump body is in lowered position, said parts will be compactly folded and housed beneath the dump body so as to occupy very little space.

A further object is to provide the upper ends of the lifting arms with rollers which engage tracks on the bottom of the dump body near the free end thereof so as to increase the leverage thereon and facilitate elevating and dumping the load.

A still further object of the invention is generally to improve this class of devices so as to increase their utility, durability and efficiency.

In the accompanying drawings forming a part of this specification and in which similar numerals of reference indicate corresponding parts in all the figures of the drawings:

Figure 1 is a side elevation, partly in section, of a portion of a standard pick-up truck showing the dumping unit slid within the body of said pick-up truck, Figure 2 is a transverse sectional view taken on the line 2—2 of Figure 1, Figure 3 is a vertical sectional view taken on the line 3—3 of Figure 2, Figure 4 is a horizontal sectional view, partly in elevation, taken on the line 4—4 of Figure 3, Figure 5 is a vertical sectional view showing the movement of the dump body and its associated parts, Figure 6 is a vertical sectional view taken on the line 6—6 of Figure 5, Figure 7 is a detail perspective view of a portion of the lower frame showing the construction of the wedge-shaped members for effecting movement of the lifting arms, Figure 8 is a side elevation illustrating a modified form of the invention in which the lifting arms are pivotally connected with the dump body by a conventional break joint hinge connection, the truck body being shown in partially elevated position, and Figure 9 is a side elevation showing the combined dump body and power plant pivotally mounted for turning movement on a platform truck or car truck to permit dumping of the load at either side of said truck.

The improved device forming the subject-matter of the present invention comprises a portable combined dump body and power plant, complete in itself, and which may be slid, as a unit, within the body of a standard pick-up truck 5, as shown in Figure 1 of the drawings, or permanently bolted to any style of automobile truck chassis or positioned on the platform of a hauling truck or railway hand car, as shown in Figure 9 of the drawings.

The portable unit comprises a supporting base or frame 6 on the rear end of which is pivotally mounted, at 7, a dump body 8. The dump body 8 is preferably formed of metal and is provided with a suitable end gate 9. The front and rear walls of the body are higher than the side walls thereof and secured to the bottom of said body are spaced channel irons forming guide tracks 10. The supporting frame 6 is relatively shallow in depth and consists of spaced longitudinally disposed Z-shaped bars 11 which constitute runners making it easy to slide the unit into a pick-up truck or onto a platform truck. It will here be noted that no bolts or other fastening devices are required to hold the unit in position on said pick-up truck as the weight of the unit will retain the device in position, while, at the same time, permitting said unit to be removed from the pick-up truck whenever it is desired to use the latter in the ordinary manner.

The Z-shaped bars 11 are connected by intermediate transverse angle bars 12 and disposed at the center of the frame 6 and secured to said transverse bars are auxiliary longitudinal angle bars 13 connected by a bottom plate 14 to form a receiving trough or chamber 15.

Mounted on the frame 6 adjacent the cab of the pick-up truck is a standard high pressure pump 15' having a controlling lever 16 operatively connected therewith and provided with a tube or conductor 17 leading to a ram 18, said parts constituting an hydraulic power unit complete in itself for effecting dumping movement of the body of the portable unit.

Pivotally mounted at 19 within the receiving trough 15 is the adjacent end of a lifting member 20, said lifting member comprising spaced arms 21 connected by a reinforcing plate 22 and having rollers 23 journaled on the free end thereof and which rollers travel in the tracks 10 as the lifting member is raised and lowered. It will here be noted that the rollers 23 engage the tracks 10 near the free end of the dump body so as to increase the leverage thereon and thus facilitate elevating and dumping the load.

Forming a part of the ram 18 is a sliding rod 24 provided with a cross-head 25 on which are mounted for rotation rollers 26 and 27, the rollers 27 being preferably smaller in diameter than the rollers 26, as best shown in Figure 7 of the drawings.

Secured to the plate 14 is a wedge-shaped member or block 28, the inclined face 29 of which engages the small rollers 27 for the purpose of imparting the initial upward tilting movement to the lifting member 20. The larger rollers 26 are disposed on opposite sides of the wedge-shaped member 28 and said large rollers are adapted to engage substantially triangular shaped blocks or members 30 secured to the lifting member 20 adjacent the pivot 19 thereof. These triangular members 30 are provided with intersecting inclined faces 31 and 32, the inclined faces 31 being preferably longer than the inclined faces 32 and disposed at an angle of approximately thirty degrees with respect to the back plate 22 so as to assure gradual elevation of the lifting arm. The inclined faces 32 of the triangular members are disposed at an angle of approximately forty-five degrees with respect to said back plate 22 so as to accelerate the tilting movement of the lifting member during the discharge of the load.

Secured to the frame 6 adjacent the hydraulic pump 15' is a U-shaped member or yoke 33 which serves as a handle for turning the unit when the latter is mounted on a platform truck.

Under normal conditions the lifting member 20 together with the ram 18 and its associated parts will lie flat within the trough 15 of the supporting frame 6 with the dump body 8 resting on the upper surface of the frame 6, as best shown in Figure 3 of the drawings. With the parts in this position, the dump body may be slid as a unit within the body of the pick-up truck 5 so as to convert the pick-up truck into a power actuated dumping truck. By operating the handle 16 of the pump 15' pressure will be admitted to the ram 18 so as to extend the rod 24 and cause the rollers carried by said rod to engage the wedge shaped and triangular shaped members previously referred to. As the rod 24 is forced outwardly under pressure, the small rollers 27 will ride over the inclined face 29 of the wedge-shaped member 28 and the large rollers 26 will ride over the long inclined faces 31 of the triangular members 30 thereby applying maximum pressure slowly to the lifting member to elevate the load. The speed of tilting movement of the lifting member is gradually increased until the rollers 26 come in contact with the short inclined faces 32 when the ram will exert a direct thrust thereon and thus accelerate tilting movement of said lifting member and consequently accelerate the discharge of the load. During the tilting movement of the lifting member, the rollers 23 will ride in the tracks 10, as will be readily understood. When pressure is removed from the ram, the parts will be moved to the position shown in Figure 3 of the drawings and in which position they are substantially housed within the frame 6 so as to occupy very little space when transporting the unit or when positioning said unit in or removing the unit from a pick-up truck, or other conveyance.

In Figure 8 of the drawings, there is illustrated a modified form of the invention in which the tracks 10 and rollers on the end of the lifting member 20 are dispensed with, said lifting member being provided with a conventional break joint hinge connection comprising a link 34, one end of which is pivotally connected at 35 to the lifting member and the other end thereof pivoted directly at 36 to the portable dump body.

In Figure 9 of the drawings, there is illustrated a further modified form of the invention in which the combined dump body and power plant is mounted on a platform truck or railway tool car. In this form of the device, the platform 37 of the truck is provided with a suitable turntable 38 and the portable dump body positioned thereon with the Z-shaped bars or runners resting on the turntable. When the device is used in this manner, the dump body may be turned or rotated to any desired position with respect to the platform 37 by means of the handle 33 and thus permit dumping of the load on any side of the platform. If desired, however, the turntable may be dispensed with and the unit supported on the platform with the Z-shaped bars or runners resting directly thereon.

It will be noted that the construction of the supporting base and arm lifting mechanism is such that said mechanism folds in much less space than with the conventional type or types of hoist mechanism, thus rendering the device more convenient to handle and install than heretofore.

When the power unit is used on some types of automobile truck chassis, said unit may, if desired, be permanently installed thereon and to accomplish that purpose, the Z-bars or other bars constituting the supporting frame are provided with spaced openings indicated at 11' in Figure 2 of the drawings, for the reception of suitable securing bolts. By releasing these securing bolts the dump body may be removed as a unit from the truck and quickly and permanently secured in position on another truck by the same securing bolts, whenever desired.

It will thus be seen that there is provided a self-contained portable power unit which can be manufactured at minimum cost and either permanently or temporarily installed on any type of conveyance by one man without requiring the services of a skilled mechanic.

From the foregoing description, it is thought that the construction and operation of the device will be readily understood by those skilled in the art and further description thereof is deemed unnecessary.

Having thus described the invention, what is claimed as new is:

1. A dumping device for vehicles comprising a supporting frame, a wedge-shaped member mounted on the frame, a dump body pivotally connected with said frame, a lifting member pivoted to the frame at the rear of the wedge-shaped member and operatively connected with the dump body, laterally spaced substantially triangular shaped members secured to the inner face of the lifting member near the pivoted end thereof, an hydraulic pump including a ram, and rollers carried by the ram and adapted to successively engage said wedge-shaped and triangular members for initially imparting a slow tilting movement to the dump body and accelerating the tilting movement as the body approaches dumping position.

2. A dumping device for vehicles comprising a supporting frame provided with a trough, a dump body pivotally mounted for tilting movement on the frame, a wedge-shaped member disposed within the trough, a lifting member pivotally mounted on the frame at the rear of the wedge-shaped member and having sliding engagement with the bottom of the dump body, an hydraulic pump including a ram, substantially triangular shaped members carried by the lifting member, and a rod forming part of the ram and provided with rollers of different sizes adapted to successively engage the wedge-shaped and triangular members for initially imparting a slow tilting movement to the dump body and then accelerating the tilting movement as said body approaches dumping position, the lifting member and ram being foldable within the trough of the supporting frame when the dump body is in lowered position.

3. A dumping device for vehicles comprising a supporting frame, a dump body pivotally mounted for tilting movement thereon, a wedge-shaped member mounted on the frame, a lifting member pivotally connected with said frame and having its free end operatively connected with the dump body, triangular members secured to the lifting member and having intersecting inclined faces of different lengths, the long face being disposed at an angle of approximately thirty degrees with respect to the lifting element and the short inclined face at an angle of approximately forty-five degrees, an hydraulic pressure pump including a ram, and rollers of different sizes carried by the ram, the small rollers by engagement with the wedge-shaped member serving to impart a slow tilting movement to the dump body and the large rollers by engagement with the short inclined faces of the triangular members serving to accelerate the tilting movement of the dump body as said body approaches dumping position.

4. A dumping device for vehicles comprising a supporting frame formed with a longitudinal trough, a dump body pivotally mounted for tilting movement on the supporting frame, a lifting arm pivotally mounted within the trough and having its upper end provided with a roller engaging the bottom of the dump body near the free end thereof, a wedge-shaped member disposed within the trough, substantially triangular-shaped members carried by the lifting arm, an hydraulic power plant including a pump and ram, a rod forming a part of the ram and provided with a cross-head, relatively small rollers mounted on the cross-head and engaging the wedge-shaped member, and larger rollers mounted on the cross-head on opposite sides of the small rollers and adapted to engage the triangular members, said lifting arm, ram and rollers being movable to a position within the trough when the dump body is in lowered position.

5. A dumping device for vehicles including a supporting frame having a receiving trough, a dump body pivotally mounted for tilting movement on the frame, and a hydraulic power plant for raising and lowering the dump body, said power plant including a lever means pivotally connected at one end thereof to the frame, and engageable at the other end with the dump body, and a ram pivotally mounted within the trough and operatively connected with the dump body and engageable with said lever means for imparting a slow tilting movement to said dump body when power is first applied thereto, said ram, upon raising of said lever means gradually shifting the point of contact thereof with said lever means toward the fulcrum of the lever means, for accelerating the tilting movement of said body as it approaches dumping position, the lever means and ram being foldable within the receiving trough when the dump body is in lowered position.

CHARLES R. GOLAY.